United States Patent [19]
Sato

[11] Patent Number: 5,793,536
[45] Date of Patent: Aug. 11, 1998

[54] ZOOM LENS

[75] Inventor: Haruo Sato, Kawaguchi, Japan

[73] Assignee: Nikon Corporation, Tokyo, Japan

[21] Appl. No.: 636,947

[22] Filed: Apr. 24, 1996

[30] Foreign Application Priority Data

Jun. 5, 1995 [JP] Japan ..................... 7-161490

[51] Int. Cl.$^6$ ..................... G02B 15/14; G02B 3/02
[52] U.S. Cl. ..................... 359/691; 359/682; 359/708
[58] Field of Search ..................... 359/691, 690, 359/683, 793, 713, 682, 681, 708

[56] References Cited

U.S. PATENT DOCUMENTS

| | | | |
|---|---|---|---|
| 5,076,677 | 12/1991 | Sato | 359/691 |
| 5,329,402 | 7/1994 | Sato | 359/691 |
| 5,331,464 | 7/1994 | Ito et al. | 359/691 |
| 5,539,581 | 7/1996 | Sato | 359/691 |
| 5,563,739 | 10/1996 | Sato | 359/691 |

FOREIGN PATENT DOCUMENTS 5-249373  9/1993  Japan .
5-249374  9/1993  Japan .

*Primary Examiner*—Georgia Y. Epps
*Assistant Examiner*—Jordan M. Schwartz
*Attorney, Agent, or Firm*—Shapiro & Shapiro

[57] ABSTRACT

In a zoom lens having a negative lens unit and a positive lens unit, a first lens unit G1 has, in succession from the object side, a first negative meniscus lens component L11 having its concave surface facing the image side, a second negative lens component L12 and a third positive lens component L13 having a convex surface facing the object side, a second lens unit G2 has, in succession from the object side, a first positive lens component L21, a second positive lens component L22, a third negative lens component L23 and a fourth positive lens component L24 separated from one another, at least one of the lens surfaces of the first negative meniscus lens component L11 and second negative lens component L12 in the first lens unit G1 is formed into an aspherical shape, and predetermined conditional expressions are satisfied.

19 Claims, 12 Drawing Sheets

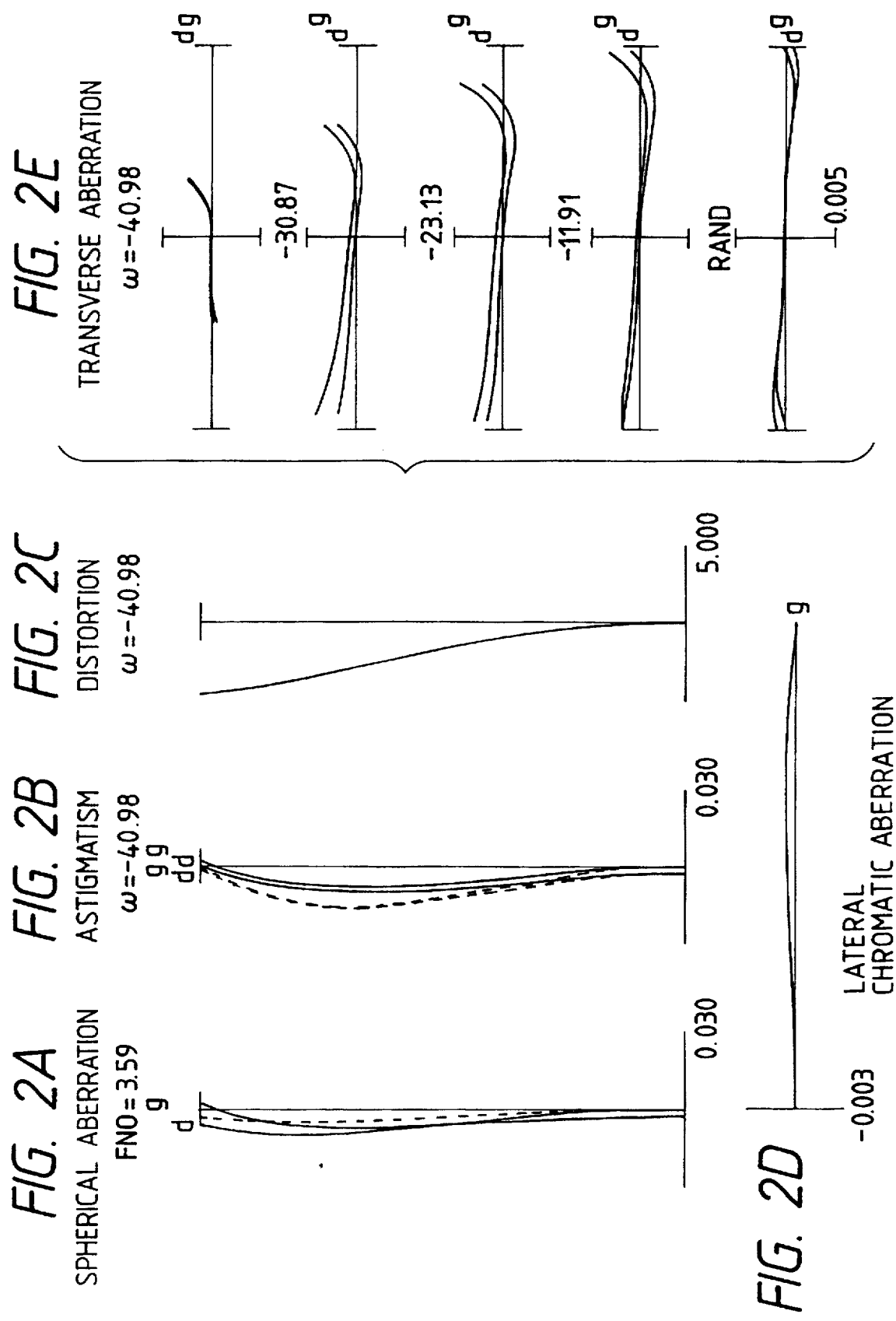

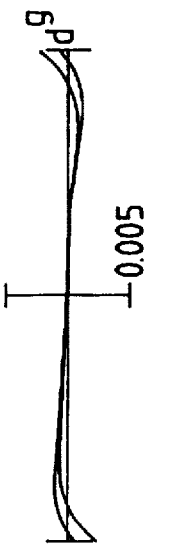
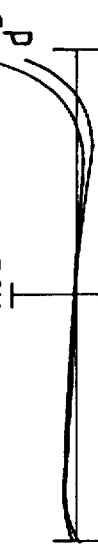
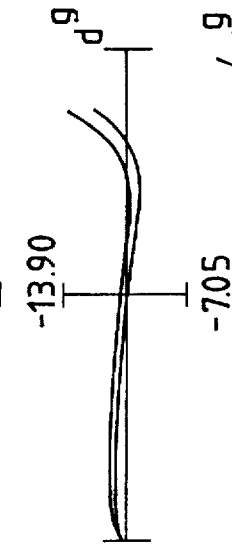
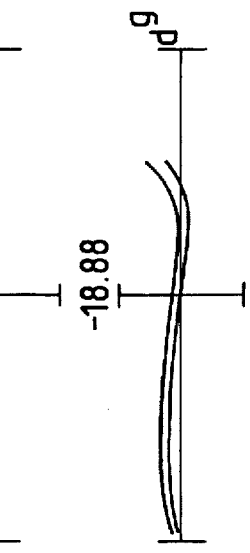
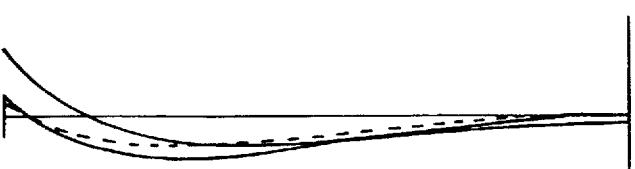

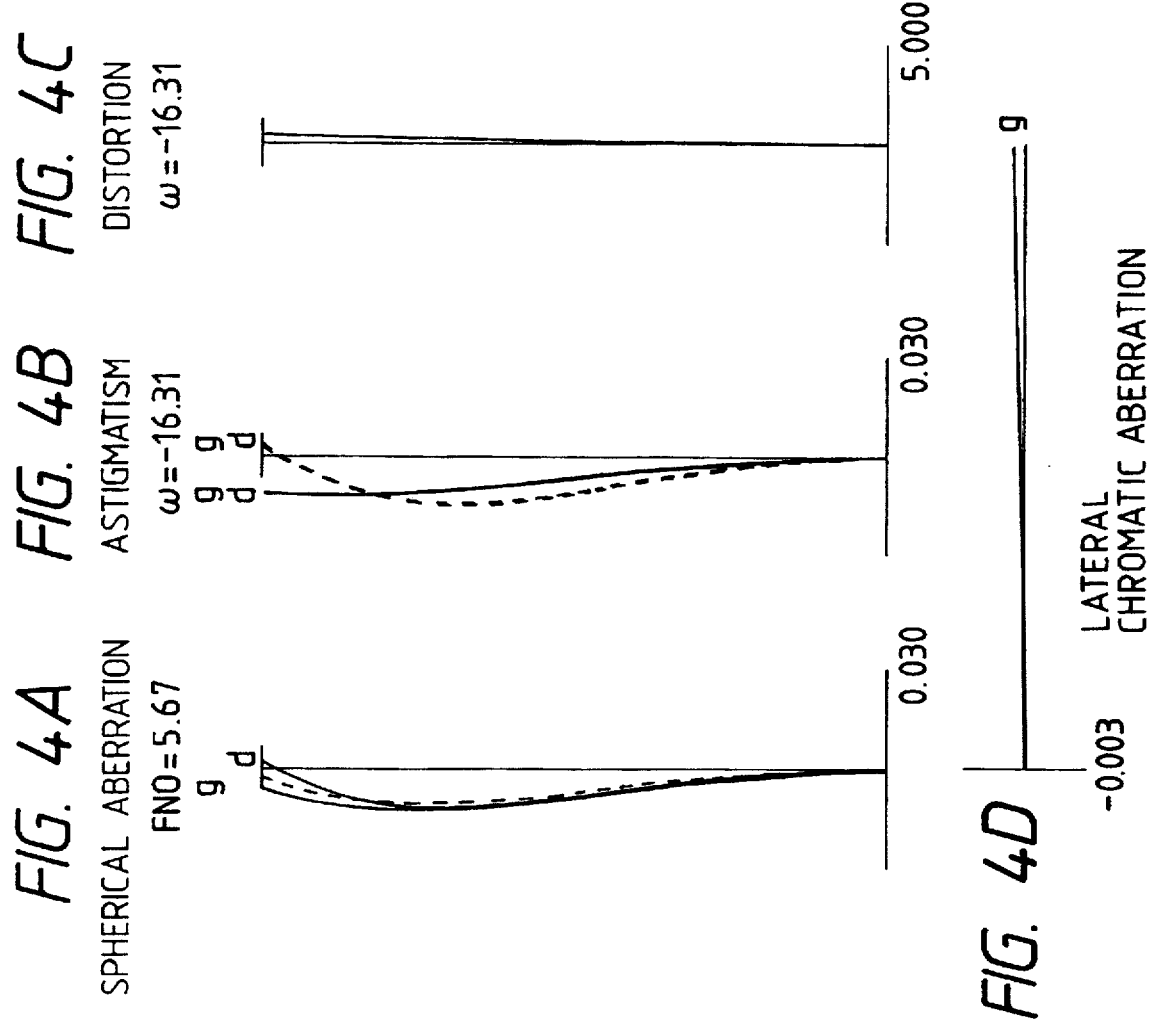
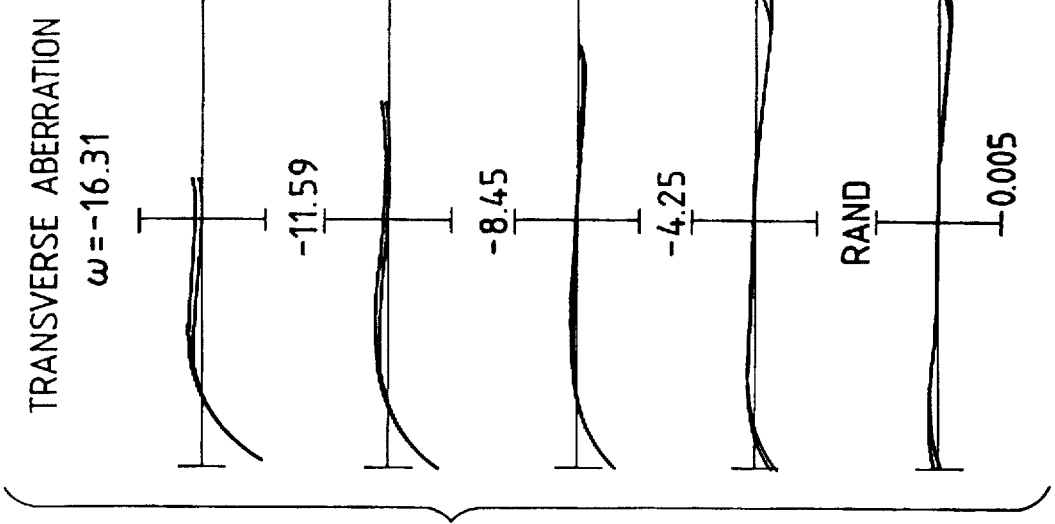

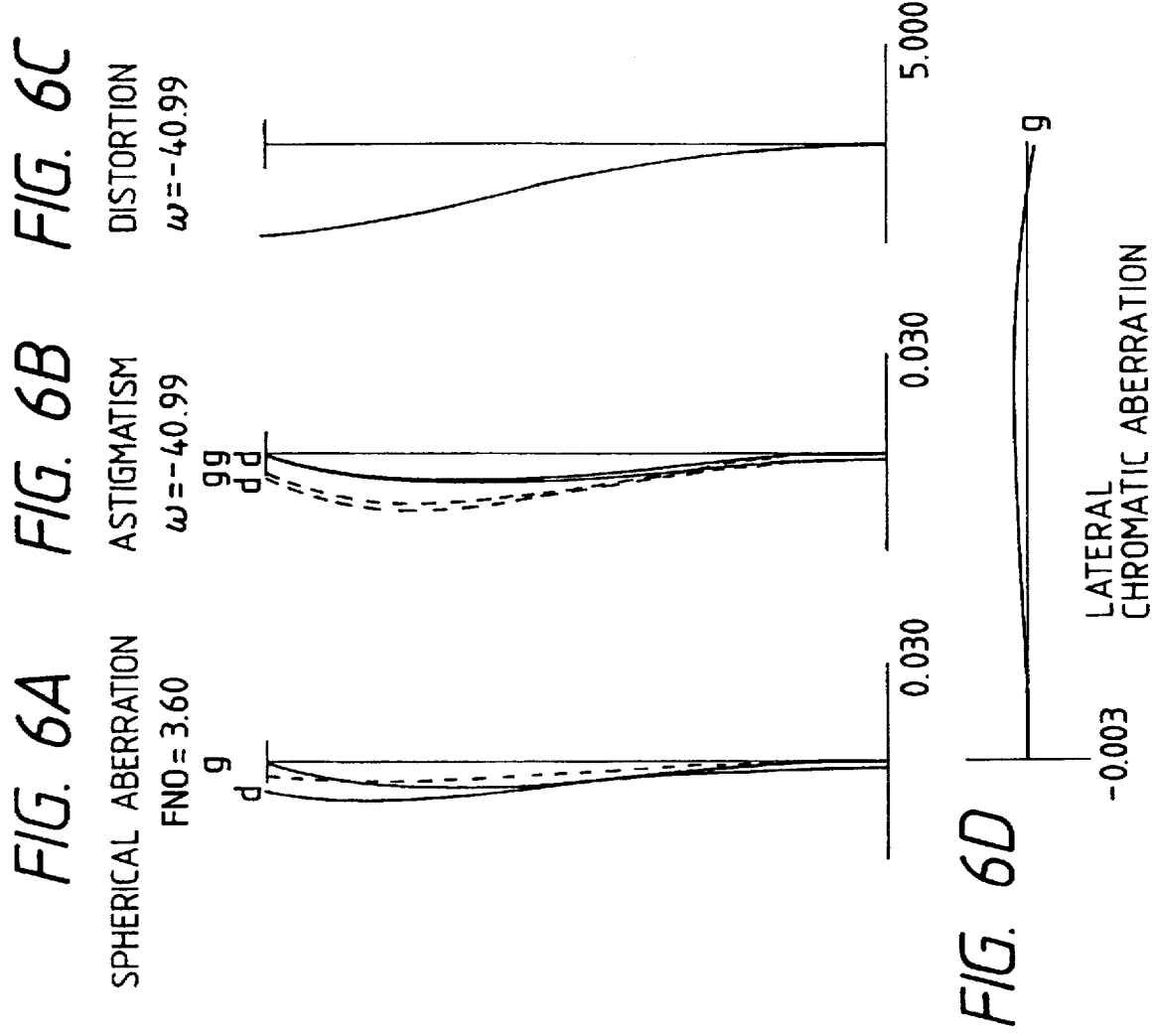

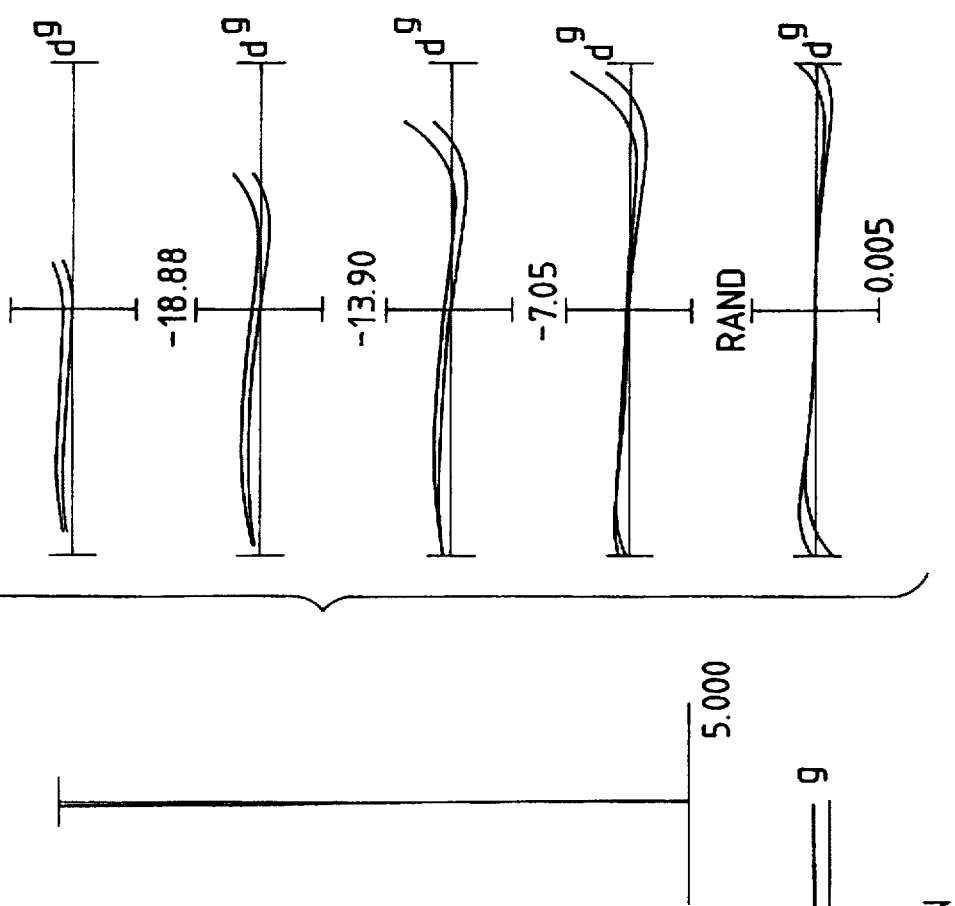

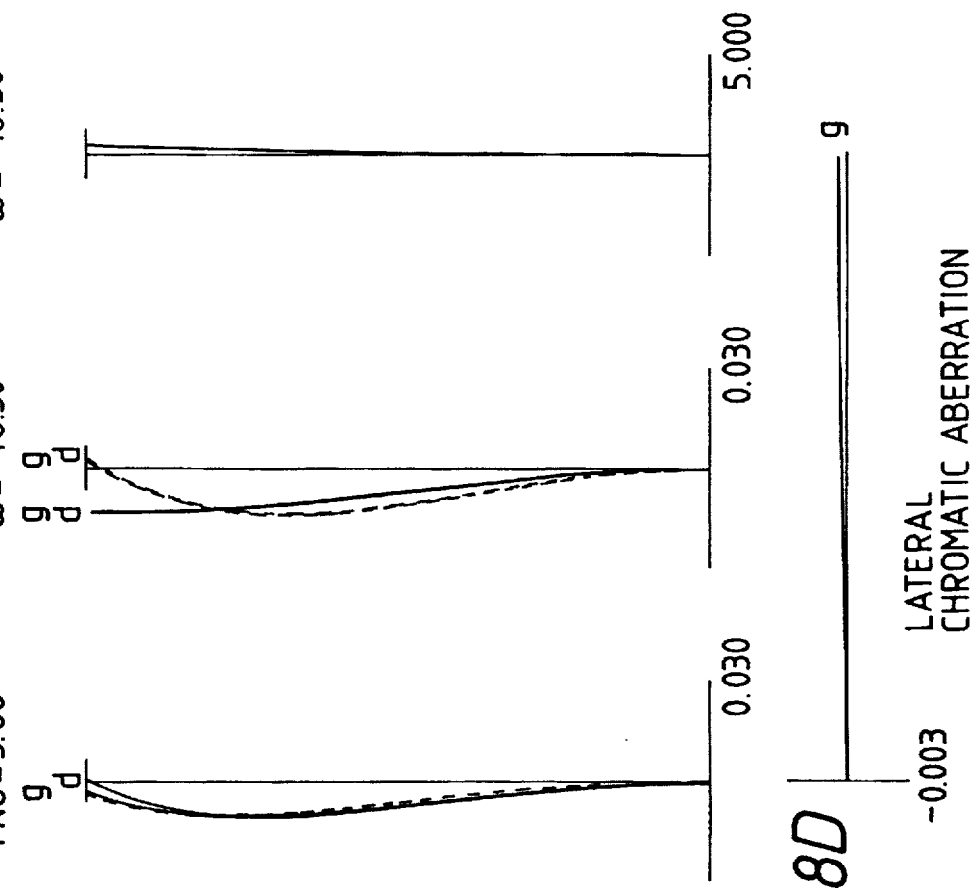

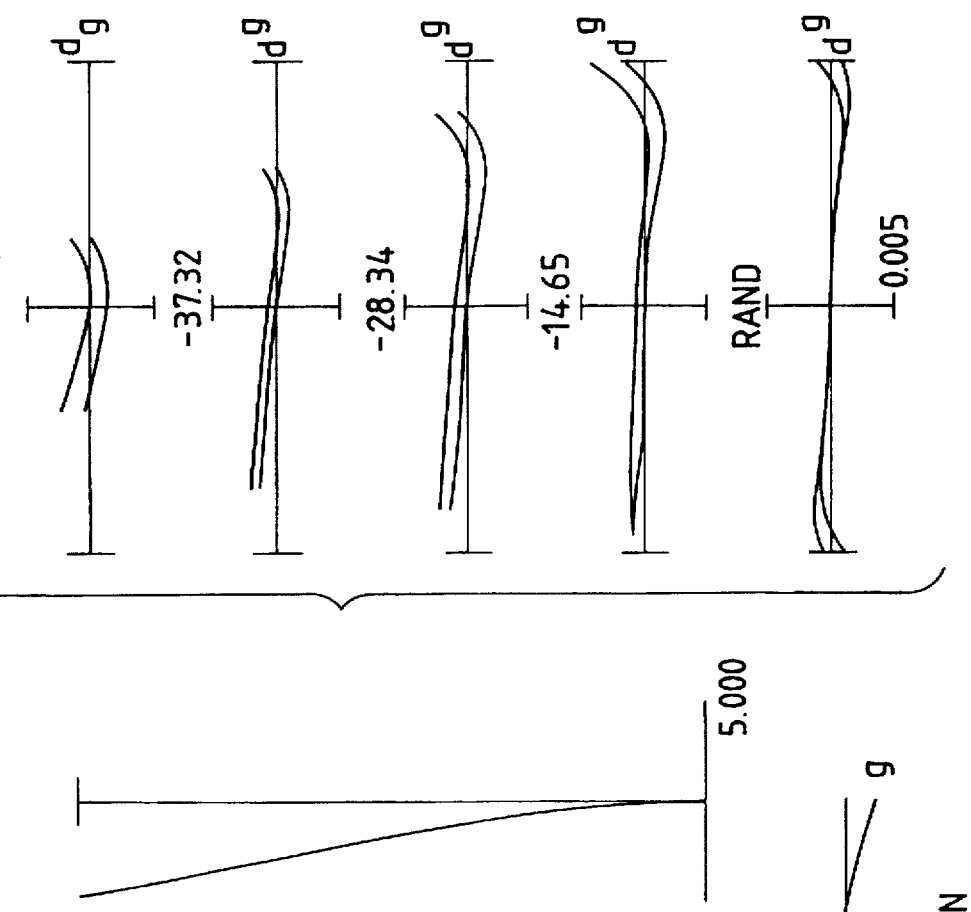

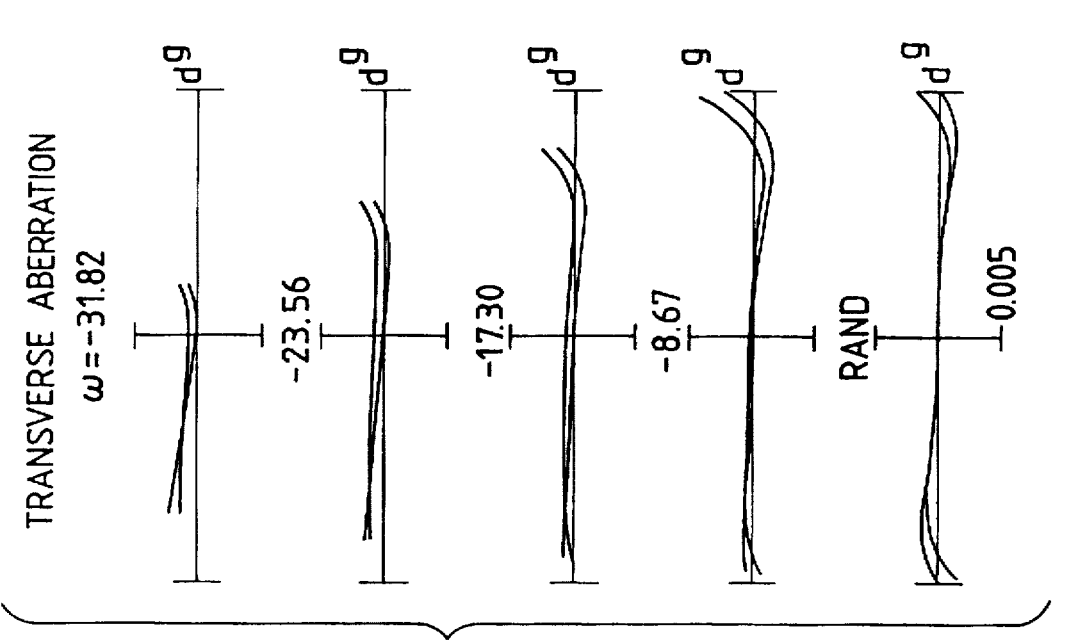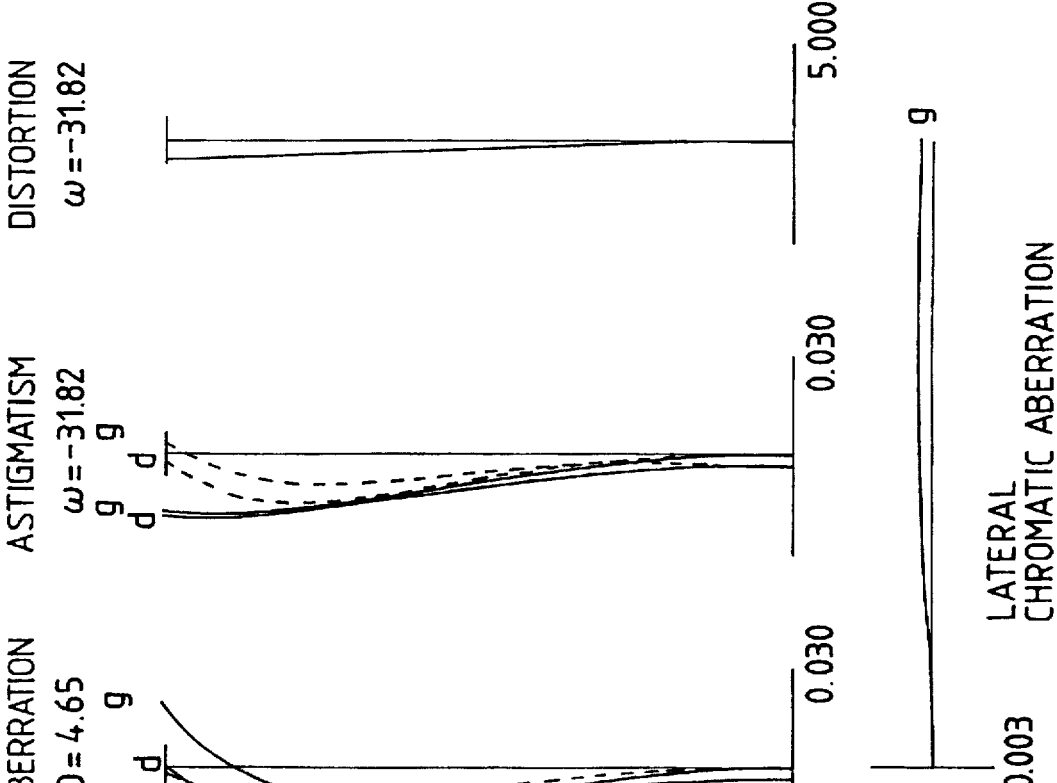

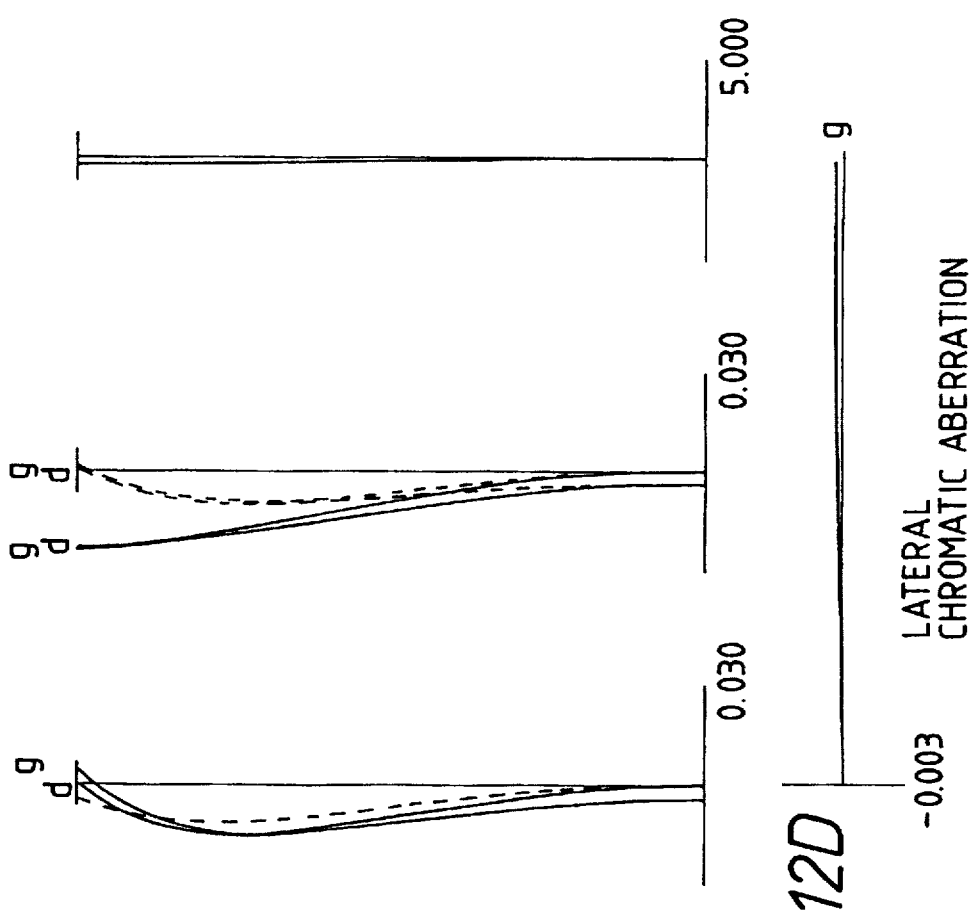

ZOOM LENS

BACKGROUND OF THE INVENTION

1. Field of the Invention

This invention relates to a zoom lens, and particularly to a compact wide angle zoom lens having a high zooming ratio.

2. Related Background Art

In recent years, super-wide angle zoom lenses and wide angle lenses in interchangeable lenses for still cameras and video cameras have been progressing towards more compactness and higher magnifications. Particularly, to realize an inexpensive wide angle lens and a super-wide angle lens, a zoom lens of the negative-positive two-unit construction and a three-unit zoom lens basically having a negative-positive two-unit zoom type construction and having a third lens unit of very weak refractive power added to the image side are suitable. There have been made various proposals about these zoom types.

As these zoom types, there are known zoom lenses disclosed, for example, Japanese Patent Application Laid-Open No. 5-249373 and Japanese Patent Application Laid-Open No. 5-249374.

In the zoom lens disclosed in the above-mentioned Japanese Patent Application Laid-Open No. 5-249373, a first lens unit comprises two negative meniscus lenses and a positive lens and the number of constituent lenses is small to thereby achieve the thinning of the lens. Also, in the zoom lens disclosed in Japanese Patent Application Laid-Open No. 5-249374, a first lens unit comprises a negative meniscus lens and a positive meniscus lens and is comprised of a minimum number of constituent lenses capable of being achromatized.

However, in the zoom lenses described in the above-mentioned two publications, the variable power ratio is relatively small, i.e., about 1.96. For wide angle zoom lenses and super-wide angle zoom lenses in the future, higher variable power and further compactness are necessary.

SUMMARY OF THE INVENTION

The present invention has been made in view of the above-noted problem and has as its object to provide a zoom lens which has high variable power and is small in the number of constituent lenses and compact and which can realize low costs and is excellent in mass productivity.

To solve the above-noted problem, the present invention provides a zoom lens provided, in succession from the object side, with a first lens unit G1 having negative refractive power as a whole, and a second lens unit G2 having positive refractive power as a whole, the air space between said first lens unit G1 and said second lens unit G2 being varied to thereby effect focal length change, characterized in that the following conditions are satisfied:

$$1.2 \leq X_{II}/fw \leq 2.5$$

$$-1 \leq (r2+r1)/(r2-r1) \leq 2,$$

where said first lens unit G1 has, in succession from the object side, a first negative meniscus lens component L11 having its concave surface facing the image side, a second negative lens component L12 and a third positive lens component L13 having a convex surface facing the object side, said second lens unit G2 has, in succession from the object side, a first positive lens component L21, a second positive lens component L22, a third negative lens component L23 and a fourth positive lens component L24 separated from one another, at least one of the lens surfaces of said first negative meniscus lens component L11 and said second negative lens component L12 in said first lens unit G1 formed into an aspherical shape, and when the focal length of the whole lens system at the wide angle end is fw and the maximum amount of movement of said second lens unit G2 during focal length change is XII and the radius of curvature of that surface of said second negative lens component L12 in said first lens unit G1 which is most adjacent to the object side is r1 and the radius of curvature of that surface of said second negative lens component L12 which is most adjacent to the image side is r2.

According to a most preferred mode of the present invention, the following condition is further satisfied:

$$0.6 \leq |f1|/(fw \cdot ft)^{1/2} \leq 1.1,$$

where the focal length of said first lens unit G1 is f1 and the focal length of the whole lens system at the telephoto end is ft.

According to a preferred mode of the present invention, the following condition is further satisfied:

$$-3 < (rb+ra)/(rb-ra) < 1,$$

where the radius of curvature of that surface of said fourth positive lens component L24 in said second lens unit G2 which is most adjacent to the object side is ra and the radius of curvature of that surface of said fourth positive lens component L24 which is most adjacent to the image side is rb.

The lens construction of the first lens unit G1 of the zoom lens of the present invention will first be described.

In the present invention, the first lens unit G1 has, in succession from the object side, a first negative lens component L11, a second negative lens component L12 and a third positive lens component L13.

Thus, the first lens unit G1 basically is of a three-lens construction, and at least one of the lens surfaces of the first negative meniscus lens component L11 and the second negative lens component L12 is formed into an aspherical shape.

By the first negative lens component L11 being made into a meniscus shape, the correction of lower coma, astigmatism, etc. particularly on the wide angle side becomes more advantageous. If the second negative lens component L12 is also made into a meniscus shape having its convex surface facing the object side, it will become advantageous for the correction of the above-mentioned aberrations. However, in the case of a zoom lens like that of the present invention which includes a super-wide angle area having a maximum of $2\omega=95.5°$ on the wide angle end, it will result in an increase in the diameter of the foremost lens and will further lead to the bulkiness and thickening of the first lens unit G1. Also, when an attempt is made to realize a high magnification compact zoom lens like that of the present invention having a maximum variable power ratio of 2.83 times, the degree of freedom of the correction of lower coma and spherical aberration is deficient particularly on the telephoto side and it becomes difficult to effect good aberration correction. Accordingly, in the present invention, the shape of the second negative lens component L12 is not a meniscus shape having its convex surface facing the object side, but is designed to satisfy conditional expression (3) which will be described later.

Also, by introducing at least one aspherical surface into at least one of the first negative lens component L11 and the second negative lens component L12, there is provided the effect of further supplementing the correction of lower coma and distortion and of spherical aberration on the telephoto side.

Further, the aspherical surface differs in its effect depending on the position into which it is introduced, by the relation between the height h of the paraxial ray and the height h' of the paraxial principal ray, but in the present invention, an aspherical surface is introduced into at least one of the negative lens components L11 and L12 in the first lens unit G1 so as to be more effective to make the correction of lower coma, astigmatism and distortion on the wide angle side and the correction of lower coma on the telephoto side well balanced to the utmost. In an embodiment of the present invention, as the more effective example, there is further shown an example in which an aspherical surface is introduced into the image side surface of the first negative lens component L11.

Also, in the present invention, the design of the aspherical surface is made by the utilization of a cone coefficient κ, fine aberration correction up to high-order aberrations is made possible to the same degree as or further than controlling the 10th-order or higher-order aspherical surface term, and as a result, even if in the first lens unit G1, an aspherical surface is introduced into a surface relatively adjacent to the object side, the degree of freedom of the aberration correction on the telephoto side will also increase and aberration correction will become possible with good balance.

Also, in the present embodiment, the refractive power of the first lens unit GI can be relatively strengthened by the above-described construction and the above-described method of using the aspherical surface, and the downsizing of the zoom lens and the downsizing of a filter size become possible.

Accordingly, when a high magnification compact zoom lens like that of the present invention including a super-wide angle area is to be realized, it is necessary to make the first lens unit G1 into a construction having at least three negative, negative and positive components, and introduce an appropriate shape of each lens component and an aspherical surface.

Description will now be made of the relation between the refractive power of the first lens unit G1 and the lens full length (the distance from that surface of the first lens unit G1 which is most adjacent to the object side to the image plane).

Generally, taking a negative-positive two-unit zoom lens as an example, when the focal length of the whole lens system at the wide angle end is fw and the focal length of the whole lens system at the telephoto end is ft and the focal length of the first lens unit G1 is fI, if a relation shown in the following expression (a) is established, the lens full length at the wide angle end and the lens full length at the telephoto end become equal to each other and the variation in the full length of the lens by focal length change becomes minimum.

$$fI = -(fw \cdot ft)^{1/2} \quad (a)$$

Accordingly, it is not preferable to choose the focal length fI of the first lens unit G1 so as to remarkably depart from the relation shown in expression (a), because the variation in the full length of the lens by focal length change becomes too great.

Also, when the magnification of the second lens unit G2 which is a converging lens unit at the telephoto end is βt, a relation shown in the following expression (b) is established.

$$ft = fI \cdot \beta t \quad (b)$$

To achieve the compactness (downsizing) of the zoom lens, it is necessary to use the second lens unit G2 at the telephoto end at a magnification exceeding one-to-one magnification. Further, to effect compact and good aberration correction and yet satisfy the relations of the above-mentioned expressions (a) and (b), each lens unit is used at relatively strong refractive power. Accordingly, in conventional zoom lenses, there has been a tendency to construct each lens unit of a number of lenses. As a result, it has sometimes happened that each lens unit become thick and the effect of downsizing is lessened.

In the zoom lens of the present invention, however, unlike the prior art, the first lens unit G1 is comprised of three negative, negative and positive lens components, and by the relations of the above-mentioned two expressions (a) and (b) being taken into account, a refractive power arrangement suited for downsizing is set.

Further, in order to make the filter size smaller and increase the quantity of marginal light particularly during short distance focusing, the focal length fI of the first lens unit G1 in expression (a) is set to a relatively small value as compared with the prior art so as to decrease the amount of movement of the first lens unit G1 during focusing.

Thus, according to the present invention, there can be realized a high magnification super-wide angle zoom lens which is compact and moreover small in the variation in the lens full length by focal length change and is small in the filter size but yet has a sufficient quantity of marginal light and which is small in the amount movement of a focusing lens unit during focusing and is low in cost.

The conditional expressions of the present invention will hereinafter be described.

In the zoom lens of the present invention, it is preferable to satisfy the following conditional expressions (1) to (3):

$$-1 \leq (r2+r1)/(r2-r1) \leq 2 \quad (1)$$

$$1.2 \leq XII/fw \leq 2.5 \quad (2)$$

$$0.6 \leq |fI|/(fw \cdot ft)^{1/2} \leq 1.1 \quad (3)$$

where fw: the focal length of the whole lens system at the wide angle end;

XII: the maximum amount of movement of the second lens unit G2 during focal length change;

r1: the radius of curvature of that surface of the second negative lens component L12 which is most adjacent to the object side;

r2: the radius of curvature of that surface of the second negative lens component L12 which is most adjacent to the image side;

fI: the focal length of the first lens unit G1;

ft: the focal length of the whole lens system at the telephoto end.

In the present invention, however, when the second negative lens component L12 is an aspherical lens, paraxial radii of curvature are used as the radii of curvature r1 and r2. Also, when the second negative lens component L12 is a so-called compound type aspherical lens (an aspherical lens of the compound type of a plastic material and a glass material), the plastic material portion alone cannot exist independently as an optical member and therefore, the radius of curvature of the glass material portion which is the groundwork is used as the radii of curvature r1 and r2. Also, when the second negative lens component L12 is a cemented lens, the radius of curvature of that surface in the whole lens component which is most adjacent to the object side and the radius of curvature of that surface which is most adjacent to the image side are used as the radii of curvature r1 and r2, respectively.

It is to be understood that as regards the sign of the maximum amount of movement XII of the second lens unit G2 during focusing, the direction toward the object side is positive.

Conditional expression (2) prescribes an appropriate range about the amount of movement of the second lens unit G2 during focal length change.

If the upper limit value of conditional expression (2) is exceeded, the amount of movement of the second lens unit G2 during focal length change will become too great, and not only lens barrel design will become difficult, but also the lens will tend to become bulky contrary to the object of the present invention, and this is not preferable.

Also, an increase in the amount of movement of the second lens unit G2 during focal length change means an increase in the amount of variation in open F number by focal length change and therefore, as a result, F number will become great (dark) on the telephoto side, and this is not preferable.

By making the upper limit of conditional expression (2) equal to or less than 2, further downsizing can be achieved.

If conversely, the lower limit value of conditional expression (2) is exceeded, it will become impossible to secure a sufficient variable power ratio and thus, it will become impossible to realize a zoom lens which has a high magnification and which is compact and low in cost.

Also, when the refractive power of the second lens unit G2 is more strengthened to thereby realize a high magnification, the aberration fluctuation by focal length change will increase remarkably. Particularly, the fluctuation of spherical aberration and of curvature of image field during focal length change will increase remarkably, and this is not preferable.

By suppressing the lower limit of conditional expression (2) to 1.41 or greater, and preferably to 1.5 or greater, it becomes possible to display the operational effect of the present invention more reliably.

Conditional expression (1) prescribes an appropriate range about the shape factor of the second negative lens component L12 in the first lens unit G1. For the value of this conditional expression to change from the lower limit value to the upper limit value means that the shape of the second negative lens component L12 changes from the shape of a plano-concave lens having its planar surface facing the object side to a meniscus shape having its convex surface facing the image side, via the shape of a biconcave lens. This conditional expression is necessary to correct off-axis aberrations well and yet downsize the diameter of the foremost lens when as previously described, the angle of field at the wide angle end is very great as in the zoom lens of the present invention. Further, it is necessary to effect the correction of lower coma, spherical aberration, etc. on the telephoto side well when a higher magnification is put forward as in the zoom lens of the present invention.

Accordingly, if the upper limit value of conditional expression (1) is exceeded, the shape of the second negative lens component L12 will become a meniscus shape having its convex surface remarkably facing the image side and the principal point of the second negative lens component L12 will move to the object side. Therefore, the air space between the first lens unit G1 and the second lens unit G2 will become remarkably small and the first lens unit G1 and the second lens unit G2 will mechanically interfere with each other during focal length change. As a result, it will become impossible to realize a large variable power ratio. By suppressing the upper limit of conditional expression (1) to 1 or less, and preferably to 0.6 or less, it becomes possible to display the operational effect of the present invention more reliably.

If conversely, the lower limit value of conditional expression (1) is exceeded, it will result in the bulkiness by an increase in the diameter of the foremost lens and the deterioration of the performance on the telephoto side as previously described, and this is not preferable.

Conditional expression (3), as already described with respect to expression (a), is an expression regarding a variation in the lens full length in the total area of focal length change. If the value of this expression (3) exceeds 1.0, it means that the lens full length at the wide angle end becomes maximum, and if the value of conditional expression (3) is below 1.0, it means that the lens full length at the telephoto end becomes maximum.

Accordingly, if the upper limit value of conditional expression (3) is exceeded, the lens full length at the wide angle end will become greatest. Accordingly, particularly the incidence height of an oblique ray of light at the wide angle end will become remarkably great, thus resulting in an increase in the diameter of the foremost lens and the deficiency of the quantity of marginal light, and this is not preferable. Also, the amount of axial movement during focusing will increase and therefore, not only a reduction particularly in the quantity of marginal light will result during closest distance photographing, but also the incidence height of the principal ray of light will become great and therefore, the eclipse of the principal ray of light will occur due to the axial movement during focusing and thus, it will become difficult to make the closest distance shorter.

If conversely, the lower limit value of conditional expression (3) is exceeded, it will be advantageous for making the filter size smaller and securing the quantity of marginal light, but in the case of a zoom lens like that of the present invention having a high zooming ratio, not only the correction of spherical aberration particularly on the telephoto side will become difficult, but also lower coma will be aggravated and a tendency toward more negative coma will result, and this is not preferable.

By making the lower limit of conditional expression (3) equal to or greater than 0.7, it is possible to further improve the imaging performance.

Also, in the zoom lens of the present invention, it is preferable to satisfy the following conditional expression (4) in addition to the above-described conditions.

$$-3<(rb+ra)/(rb-ra)<1, \qquad (4)$$

where ra: the radius of curvature of that surface of the fourth positive lens component L24 which is most adjacent to the object side;

rb: the radius of curvature of that surface of the fourth positive lens component L24 which is most adjacent to the image side.

As already described, in the present invention, when the fourth positive lens component L24 is an aspherical lens, paraxial radii of curvature are used as the radii of curvature ra and rb. Also, when the fourth positive lens component L24 is a compound type aspherical lens (an aspherical lens of the compound type of a plastic material and a glass material), the plastic material portion alone cannot exist independently as an optical member and therefore, the radius of curvature of the glass material portion which is the groundwork is used as the radii of curvature ra and rb. Also, when the fourth positive lens component L24 is a cemented lens, the radius of curvature of that surface in the whole lens component which is most adjacent to the object side and the radius of curvature of that surface in the whole lens component which is most adjacent to the image side are used as the radii of curvature ra and rb.

Conditional expression (4) prescribes an appropriate range about the whole shape factor of the fourth positive lens component L24 in the second lens unit G2. For the value of this conditional expression to change from the lower limit value to the upper limit value means that the shape of the fourth positive lens component L24 changes from a meniscus shape having its convex surface facing the image side to the shape of a plano-convex lens having its planar surface facing the image side. The presence and shape of the fourth positive lens component L24 display a great correcting capability particularly for upper coma. Accordingly, the determination of the shape of this fourth positive lens component L24 is also important for making the aberration balance of the whole good.

If the upper limit value of conditional expression (4) is exceeded, the fourth positive lens component L24 in the second lens unit G2 will assume the shape of a positive meniscus lens having its convex surface facing the object side, beyond the shape of a plano-convex lens. As a result, the correction of upper coma will become difficult, and this is not preferable.

If the upper limit of conditional expression (4) is made equal or less than 0.5, better aberration correction will become possible.

If conversely, the lower limit value of conditional expression (4) is exceeded, the fourth positive lens component L24 in the second lens unit G2 will assume the shape of a positive meniscus lens having its convex surface remarkably facing the image side, and in the case of a two-unit zoom lens of a large variable power ratio, the correction of spherical aberration on the telephoto side will become difficult.

If the lower limit of conditional expression (4) is made equal to or greater than −1, and preferably equal to or greater than −0.5, better aberration correction will become possible.

Also, in the zoom lens of the present invention, it is preferable to satisfy the following conditional expression (5):

$$1.7 \leq (n11+n12)/2 < 2, \qquad (5)$$

where n11: the refractive index of the first negative meniscus lens component L11 for d-line;

n12: the refractive index of the second negative lens component L12 for d-line.

Conditional expression (5) prescribes an appropriate range about the average refractive index of the two negative lens components L11 and L12 in the first lens unit G1.

However, in the case of a compound type aspherical lens comprising a compound of a resin material and a glass material, considering from the viewpoint of refractive power, it is unreasonable to regard the resin material portion as a lens component. That is, the resin material portion cannot exist as an independent lens part and therefore, the compound type aspherical lens cannot be considered similarly to a cemented lens. Accordingly, the resin material portion should rather be grasped as a function added to the glass material portion. That is, the average refractive index of the two negative meniscus lenses in the first lens unit Gi should be calculated on the basis of only the refractive index of the glass lens portion which is the parent body.

Accordingly, in the conditional expression (5) of the present invention, when a compound type aspherical surface is used, calculation is done on the basis of the average refractive index by only the refractive index of the glass lens portion which is the parent body.

If the upper limit value of conditional expression (5) is exceeded, the average refractive index will become great and therefore, it will be possible to loosen the curvature of each lens (make the radius of curvature great) and the degree of freedom of aberration correction will increase, and this is advantageous. However, in the case of the present glass material, if the refractive index thereof is heightened, dispersion will become too great and the achromatism in the first lens unit G1 will become difficult. Also, considering from the chemical point of view, the transmittance of the light of short wavelength tends to be remarkably reduced and therefore, the color balance of the whole lens is remarkably aggravated, and this is not preferable.

If conversely, the lower limit value of conditional expression (5) is exceeded, in the case of a zoom lens like that of the present invention in which the first lens unit GI has strong refractive power and is compact and low in cost, the curvature of each lens will become remarkably strong (the radius of curvature will become small) and each aberration will remarkably occur in each lens surface and the degree of freedom for correcting those aberrations will be deficient. As a result, the correction of curvature of image field, astigmatism and lower coma will become difficult, and the marginal performance particularly on the wide angle side will be remarkably reduced.

By suppressing the lower limit of conditional expression (5) to 1.73 or greater, it is possible to further improve the marginal performance on the wide angle side and realize further downsizing.

Also, in the present invention, the third negative lens component L23 in the second lens unit G2 has, in succession from the object side, a cemented negative lens comprising a positive lens and a negative lens, and it is preferable to satisfy the following conditional expression (6):

$$0.1 < n3n - n3p < 0.5, \qquad (6)$$

where n3p: the refractive index of the positive lens in the cemented negative lens in the third negative lens component L23 for d-line;

n3n: the refractive index of the negative lens in the cemented negative lens in the third negative lens component L23 for d-line.

The construction in which the cemented negative lens comprising a positive lens and a negative lens is introduced into the third negative lens component L23 is effective to keep Petzval sum at an appropriate value and effect the correction of spherical aberration created by a higher magnification. In this case, better aberration correction becomes possible by prescribing the difference in refractive index between the positive lens and negative lens in the cemented negative lens to an appropriate range. Accordingly, in the zoom lens of the present invention, it is desirable to satisfy conditional expression (6).

If the upper limit value of conditional expression (6) is exceeded, Petzval sum will become too great with a result that curvature of image field will be aggravated, and this is not preferable.

If conversely, the lower limit value of conditional expression (6) is exceeded, Petzval sum will become too small and curvature of image field will be aggravated. Particularly, the difference in curvature of image field on the wide angle side by the angle of field will become remarkably great and astigmatisms will also increase, and this is not preferable. Also, the correcting capability for spherical aberration will be remarkably reduced, and this is not preferable.

If the lower limit of conditional expression (6) is made equal to or greater than 0.2, and preferably equal to or greater than 0.25, better aberration correction will become possible.

Also, in the present invention, the fourth positive lens component L24 in the second lens unit G2 has, in succession from the object side, a cemented positive lens consisting of negative lens and a positive lens, and it is preferable to satisfy the following conditional expression (7):

$$0.1 < n4n - n4p < 0.5, \tag{7}$$

where n4p: the refractive index of the positive lens in the cemented positive lens in the fourth positive lens component L24 for d-line;

n4n: the refractive index of the negative lens in the cemented positive lens in the fourth positive lens component L24 for d-line.

The construction in which the cemented positive lens consisting of a negative lens and a positive lens is introduced into the fourth positive lens component L24 is effective to keep Petzval sum at an appropriate value and for the correction of upper coma and spherical aberration and the correction of lateral chromatic aberration. In this case, better aberration correction becomes possible by prescribing the difference in refractive index between the negative lens and positive lens in the cemented positive lens to an appropriate range. Accordingly, in the zoom lens of the present invention, it is desirable to satisfy conditional expression (7).

If the upper limit value of conditional expression (7) is exceeded, Petzval sum will become too great with a result that curvature of image field will be aggravated, and this is not preferable.

If conversely, the lower limit value of conditional expression (7) is exceeded, as described above, not only the correction of upper coma and spherical aberration will become difficult, but also Petzval sum will become too small and curvature of image field will also be aggravated with a result that the number of constituent lenses will increase, and this is not preferable.

If the lower limit of conditional expression (7) is made equal to or greater than 0.2, and preferably equal to or greater than 0.25, better aberration correction will become possible.

Also, in the present invention, it is preferable to satisfy the following conditional expression (8):

$$1.0 < fII/fw < 2.5, \tag{8}$$

where fII: the focal length of the second lens unit G2.

Conditional expression (8) is a condition which prescribes the focal length fII of the second lens unit G2 to an appropriate range.

If the lower limit value of conditional expression (8) is exceeded, the refractive power of the second lens unit G2 will become remarkably strong and the variation in the full length will become small, but spherical aberration at the telephoto end will be remarkably aggravated and the fluctuation of spherical aberration by focal length change will increase, and this is not preferable.

Correcting this spherical aberration and keeping good balance with the other aberrations will lead to an increase in the number of constituents of the second lens unit G2 and thus to the thickening thereof, whereby the effect of downsizing will be lessened, and this is not preferable.

To further enhance the effect of the present invention, if the lower limit of conditional expression (8) is set to 1.4 or greater, the correction of spherical aberration and upper coma will become better.

If conversely, the upper limit value of conditional expression (8) is exceeded, the refractive power of the second lens unit G2 will become weak and therefore, the back focus of the lens system will assume a remarkably great value and as a result, the full length will become great, and this is contrary to compactness and is therefore not preferable. In addition, the variation in the full length will become great, thus resulting in bulkiness, and this is not preferable.

To further enhance the effect of the present invention, the upper limit of conditional expression (8) can be set to 2 or less, thereby realize which is more compact and is small in the variation in the full length as well as low in cost.

BRIEF DESCRIPTION OF THE DRAWINGS

FIGS. 2A–2E show the various aberrations of Embodiment 1 at the wide angle end.

FIGS. 3A–3E show the various aberrations of Embodiment 1 in the medium focal length state.

FIGS. 4A–4E show the various aberrations of Embodiment 1 at the telephoto end.

FIGS. 6A–6E show the various aberrations of Embodiment 2 at the wide angle end.

FIGS. 7A–7E show the various aberrations of Embodiment 2 in the medium focal length state.

FIGS. 8A–8E show the various aberrations of Embodiment 2 at the telephoto end.

FIGS. 10A–10E show the various aberrations of Embodiment 3 at the wide angle end.

FIGS. 11A–11E show the various aberrations of Embodiment 3 in the medium focal length state.

FIGS. 12A–12E show the various aberrations of Embodiment 3 at the telephoto end.

DESCRIPTION OF THE PREFERRED EMBODIMENTS

Each embodiment of the present invention will hereinafter be described with reference to the accompanying drawings.

A zoom lens according to each embodiment of the present invention is provided, in succession from the object side, with a first lens unit G1 having negative refractive power as a whole, and a second lens unit G2 having positive refractive power as a whole, and the air space between the first lens unit G1 and the second lens unit G2 is varied to thereby effect focal length change. The first lens unit G1 has, in succession from the object side, a first negative meniscus lens component L11 having its concave surface facing the image side, a second negative lens component L12 and a third positive lens component L13 having a convex surface facing the object side. The second lens unit G2 has, in succession from the object side, a first positive lens component L21, a second positive lens component L22, a third negative lens component L23 and a fourth positive lens component L24 separated from one another. Further, at least one of the lens surfaces of the first negative meniscus lens component L11 and second negative lens component L12 in the first lens unit G1 is formed into an aspherical shape.

When the height in a direction perpendicular to the optical axis is y and the amount of displacement in the direction of the optical axis at the height y is S(y) and the reference radius of curvature is R and the cone coefficient is κ and the nth-order aspherical surface coefficient is Cn, the aspherical surface is represented by the following mathematic expression (c):

$$S(y) = (y^2/R)/[1 + (1 - \kappa \cdot y^2/R^2)^{1/2}] + \quad (c)$$
$$C_2 \cdot y^2 + C_4 \cdot y^4 + C_6 \cdot y^6 + C_8 \cdot y^8 + C_{10} \cdot y^{10} + \ldots$$

Also, the paraxial radius of curvature r of the aspherical surface is defined by the following mathematical expression (d):

$$r = 1/(2 \cdot C_2 + 1/R) \quad (d)$$

In the table of the various elements of each embodiment, the aspherical surface is given a mark * at the left of the surface number.

[Embodiment 1]

Figures 1A, 1B, 1C:
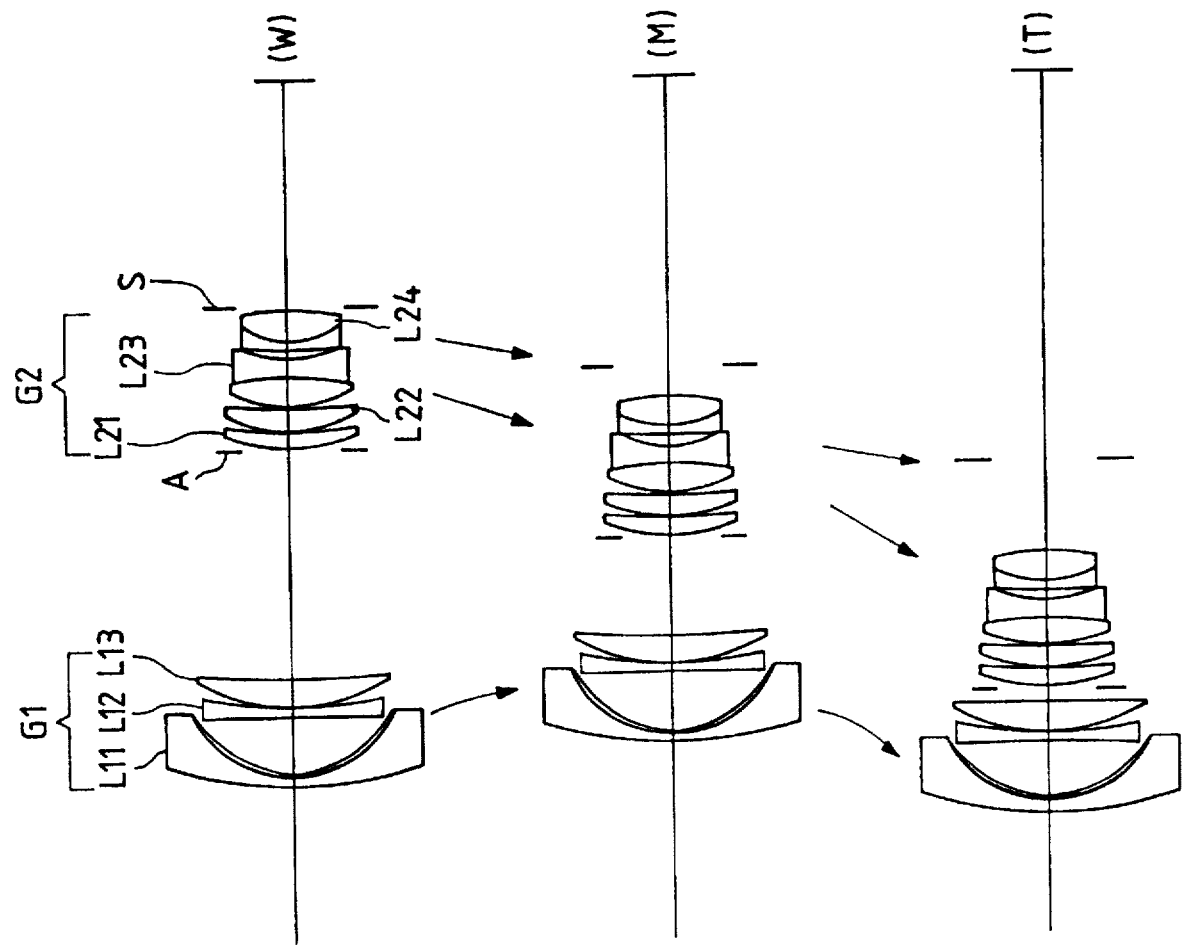
FIGS. 1A–1C show the lens construction of a zoom lens according to a first embodiment of the present invention and the movement of each lens unit during focal length change.

FIGS. 1A–1C show the lens construction of a zoom lens according to a first embodiment of each lens unit during focal length change. FIG. 1A shows the wide angle end, FIG. 1B shows the medium focal length state, and FIG. 1C shows the telephoto end.

The zoom lens of FIGS. 1A–1C is comprised, in succession from the object side, a first lens unit G1 comprising a negative meniscus lens L11 having its concave surface facing the image side, a biconcave lens L12 and a positive meniscus lens L13 having its convex surface facing the object side, and a second lens unit G2 comprising a positive meniscus lens L21 having its convex surface facing the object side, a positive meniscus lens L22 having its convex surface facing the object side, a cemented negative lens L23 consisting of a biconvex lens and a biconcave lens, and a cemented positive lens L24 consisting of a negative meniscus lens having its convex surface facing the object side and a biconvex lens.

A flare stop S is disposed rearwardly (on the image side) of the second lens unit G2 in order to effectively intercept the off-axis marginal ray of light which creates great upper coma. The flare stop S, as shown in FIGS. 1A–1C, is adapted to be moved on the optical axis independently of the second lens unit G2 during focal length change and effectively intercept upper coma flare.

Also, an aperture stop A is provided near the object side of the second lens unit G2. The aperture stop A, as shown, is moved with the second lens unit G2 during focal length change.

Further, the negative meniscus lens L11 in the first lens unit G1 is a compound type aspherical lens formed of a resin material and a glass material, and the image side surface thereof is formed into an aspherical shape.

In Table 1 below, there are given the values of the various elements of Embodiment 1 of the present invention. In Table 1, f represents the focal length, FNO represents F number, and 2ω represents the angle of field. Further, the surface numbers indicate the order of the lens surfaces from the object side, and the refractive index and Abbe number indicate values for d-line (λ=587.6 nm), respectively.

TABLE 1 f = 1.0–2.827
FNO = 3.59–5.67
2ω = 82°–32.6°

| surface No. | radius of curvature | surface interval | Abbe number | refractive index |
|---|---|---|---|---|
| 1 | 2.8900 | 0.0777 | 45.37 | 1.796681 |
| 2 | 0.7334 | 0.0015 | 55.63 | 1.506250 |
| *3 | 0.6206 | 0.4275 | | |
| 4 | −8.2489 | 0.0729 | 48.04 | 1.716999 |
| 5 | 2.8899 | 0.0049 | | |
| 6 | 1.4337 | 0.1992 | 28.56 | 1.795040 |
| 7 | 28.1762 | (d7 = variable) | | |
| 8 | ∞ | 0.0243 | (aperture stop A) | |
| 9 | 1.2946 | 0.1360 | 65.42 | 1.603001 |
| 10 | 7.4007 | 0.0049 | | |
| 11 | 1.0102 | 0.1457 | 65.42 | 1.603001 |
| 12 | 4.9871 | 0.0049 | | |
| 13 | 0.8152 | 0.2089 | 64.10 | 1.516800 |
| 14 | −2.7374 | 0.1117 | 37.17 | 1.834000 |
| 15 | 0.6125 | 0.0777 | | |
| 16 | 1.8649 | 0.0583 | 49.45 | 1.772789 |
| 17 | 0.6291 | 0.2307 | 58.90 | 1.518230 |
| 18 | −1.5181 | (d18 = variable) | | |
| 19 | ∞ | (d19 = variable) | (flare stopper S) | |

(aspherical surface data)

| | κ | $C_2$ | $C_4$ |
|---|---|---|---|
| 3rd surface | 0.1343 | 0.0000 | $1.59130 \times 10^{-1}$ |
| | $C_6$ | $C_8$ | $C_{10}$ |
| | $2.75100 \times 10^{-1}$ | $-3.82470 \times 10^{-1}$ | $1.67360 \times 10^{-1}$ |

(variable spacing in focal length change)

| f | 1.00000 | 1.70000 | 2.8270 |
|---|---|---|---|
| d7 | 1.57725 | 0.64592 | 0.11482 |
| d18 | 0.00000 | 0.22951 | 0.59928 |
| d19 | 1.58862 | 2.01389 | 2.69835 |

(condition-corresponding values)

(1) XII/fw ≦ 2.5 = 1.709
(2) (r2 + r1)/(r2 − r1) = −0.48
(3) |fII|/(fw · ft)$^{1/2}$ = 0.924
(4) (rb + ra)/(rb − ra) = −0.103
(5) (n11 + n12)/2 = 1.757
(6) n3n − n3p = 0.3172
(7) n4n − n4p2 = 0.255
(8) fII/fw = 1.457

FIGS. 2A–2E to 4A–4E show the various aberrations of Embodiment 1. FIGS. 2A–2E showing the various aberrations at the wide angle end (the shortest focal length state), FIGS. 3A–3E showing the various aberrations in the medium focal length state, and FIGS. 4A–4E showing the various aberrations at the telephoto end (the longest focal length state).

In each of these aberration graphs, FNO indicates F number, ω indicates a half angle of field, d indicates d-line (λ=587.6 nm) and g indicates g-line (λ=435.8 nm). Also, in the aberration graphs showing astigmatism, the solid line indicates the sagittal image plane and the broken line indicates the meridional image plane. Further, in the aberration graphs showing spherical aberration, the broken line indicates the sine condition.

As is apparent from each aberration graph, it is seen that in the present embodiment, the various aberrations are corrected well in the respective focal length states.

[Embodiment 2]

Figures 5A, 5B, 5C:
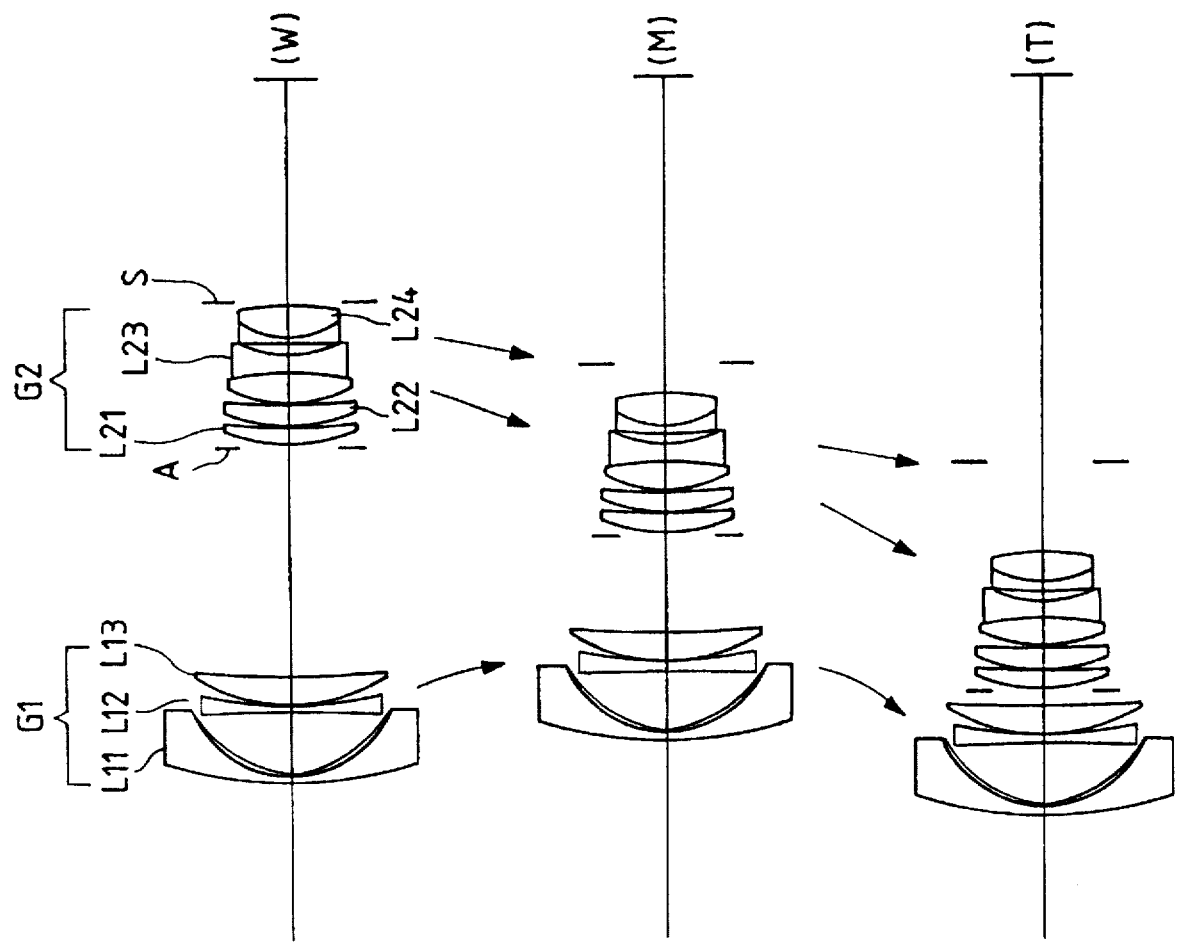
FIGS. 5A–5C show the lens construction of a zoom lens according to a second embodiment of the present invention and the movement of each lens unit during focal length change.

FIGS. 5A–5C show the lens construction of a zoom lens according to a second embodiment of the present invention and the movement of each lens unit during focal length change. FIG. 5A shows the wide angle end, FIG. 5B shows the medium focal length state, and FIG. 5C shows the telephoto end.

The zoom lens of FIGS. 5A–5C is comprised, in succession from the object side, of a first lens unit G1 comprising a negative meniscus lens L11 having its concave surface facing the image side, a biconcave lens L12 and a positive meniscus lens L13 having its convex surface facing the object side, and a second lens unit G2 comprising a positive meniscus lens L21 having its convex surface facing the object side, a positive meniscus lens L22 having its convex surface facing the object side, a cemented negative lens L23 consisting of a biconvex lens and a biconcave lens, and a cemented positive lens L24 consisting of a negative meniscus lens having its convex surface facing the object side and a biconvex lens.

A flare stop S is disposed rearwardly (on the image side) of the second lens unit G2 in order to effectively intercept the off-axis marginal ray of light which creates great upper coma. The flare stop S, as shown in FIGS. 5A–5C, is adapted to be moved on the optical axis independently of the second lens unit G2 during focal length change and effectively intercept upper coma flare.

Also, an aperture stop A is provided near the object side of the second lens unit G2. The aperture stop A, as shown, is moved with the second lens unit G2 during focal length change.

Further, the negative meniscus lens L11 in the first lens unit G1 is a compound type aspherical lens formed of a resin material and a glass material, and the image side surface thereof is formed into an aspherical shape.

In Table 2 below, there are given the values of the various elements of Embodiment 2 of the present invention. In Table 2, f represents the focal length, FNO represents F number, and 2ω represents the angle of field. Further, the surface numbers indicate the order of the lens surfaces from the object side, and the refractive index and Abbe number indicate the values for d-line (λ=587.6 nm), respectively.

TABLE 2 f = 1.0–2.825
FNO = 3.60–5.65
2ω = 82°–32.6°

| surface No. | radius of curvature | surface interval | Abbe number | refractive index |
|---|---|---|---|---|
| 1 | 2.6812 | 0.0825 | 43.35 | 1.840421 |
| 2 | 0.7476 | 0.0015 | 56.14 | 1.508030 |
| *3 | 0.6291 | 0.4223 | | |
| 4 | −7.9732 | 0.0777 | 53.75 | 1.693500 |
| 5 | 2.8752 | 0.0049 | | |
| 6 | 1.4401 | 0.1942 | 28.56 | 1.795040 |
| 7 | 24.2724 | (d7 = variable) | | |
| 8 | ∞ | 0.0243 | (aperture stop A) | |
| 9 | 1.1005 | 0.1505 | 65.42 | 1.603001 |
| 10 | 15.5934 | 0.0049 | | |
| 11 | 1.1748 | 0.1311 | 65.42 | 1.603001 |
| 12 | 3.5567 | 0.0049 | | |
| 13 | 0.8200 | 0.2185 | 64.10 | 1.516800 |
| 14 | −2.0555 | 0.1117 | 37.17 | 1.834000 |
| 15 | 0.6163 | 0.0728 | | |
| 16 | 1.9344 | 0.0485 | 49.45 | 1.772789 |
| 17 | 0.6819 | 0.2476 | 58.90 | 1.518230 |
| 18 | −1.4145 | (d18 = variable) | | |
| 19 | ∞ | (d19 = variable) | (flare stopper S) | |

TABLE 2-continued (aspherical surface data)

| | κ | $C_2$ | $C_4$ |
|---|---|---|---|
| 3rd surface | 0.1500 | 0.0000 | $1.45220 \times 10^{-1}$ |
| | $C_6$ | $C_8$ | $C_{10}$ |
| | $3.01590 \times 10^{-1}$ | $-5.36590 \times 10^{-1}$ | $3.57440 \times 10^{-1}$ |

(variable spacing in focal length change)

| f | 1.00000 | 1.69907 | 2.82532 |
|---|---|---|---|
| d7 | 1.57736 | 0.64659 | 0.11582 |
| d18 | 0.60000 | 0.24272 | 0.48545 |
| d19 | 1.57698 | 1.98962 | 2.80274 |

(condition-corresponding values)

(1) XII/fw ≦ 2.5 = 1.711
(2) (r2 + r1)/(r2 − r1) = −0.47
(3) |fIV|/(fw · ft)$^{1/2}$ = 0.924
(4) (rb + ra)/(rb − ra) = −0.155
(5) (n11 + n12)/2 = 1.767
(6) n3n − n3p = 0.317
(7) n4n − n4p2 = 0.255
(8) fII/fw = 1.456

FIGS. 6A–6E to 8A–8E show the various aberrations of Embodiment 2, FIGS. 6A–6E showing the various aberrations at the wide angle end, FIGS. 7A–7E showing the various aberrations in the medium focal length state, and FIGS. 8A–8E showing the various aberrations at the telephoto end.

In each of these aberration graphs, FNO indicates F number, ω indicates a half angle of field, d indicates d-line (λ=587.6 nm), and g indicates g-line (λ=435.8 nm). Also, in the aberration graphs showing astigmatism, the solid line indicates the sagittal image plane and the broken line indicates the meridional image plane. Further, in the aberration graphs showing spherical aberration, the broken line indicates the sine condition.

As is apparent from each aberration graph, it is seen that in the present embodiment, the various aberrations are corrected well in the respective focal length states.

[Embodiment 3]

Figures 9A, 9B, 9C:
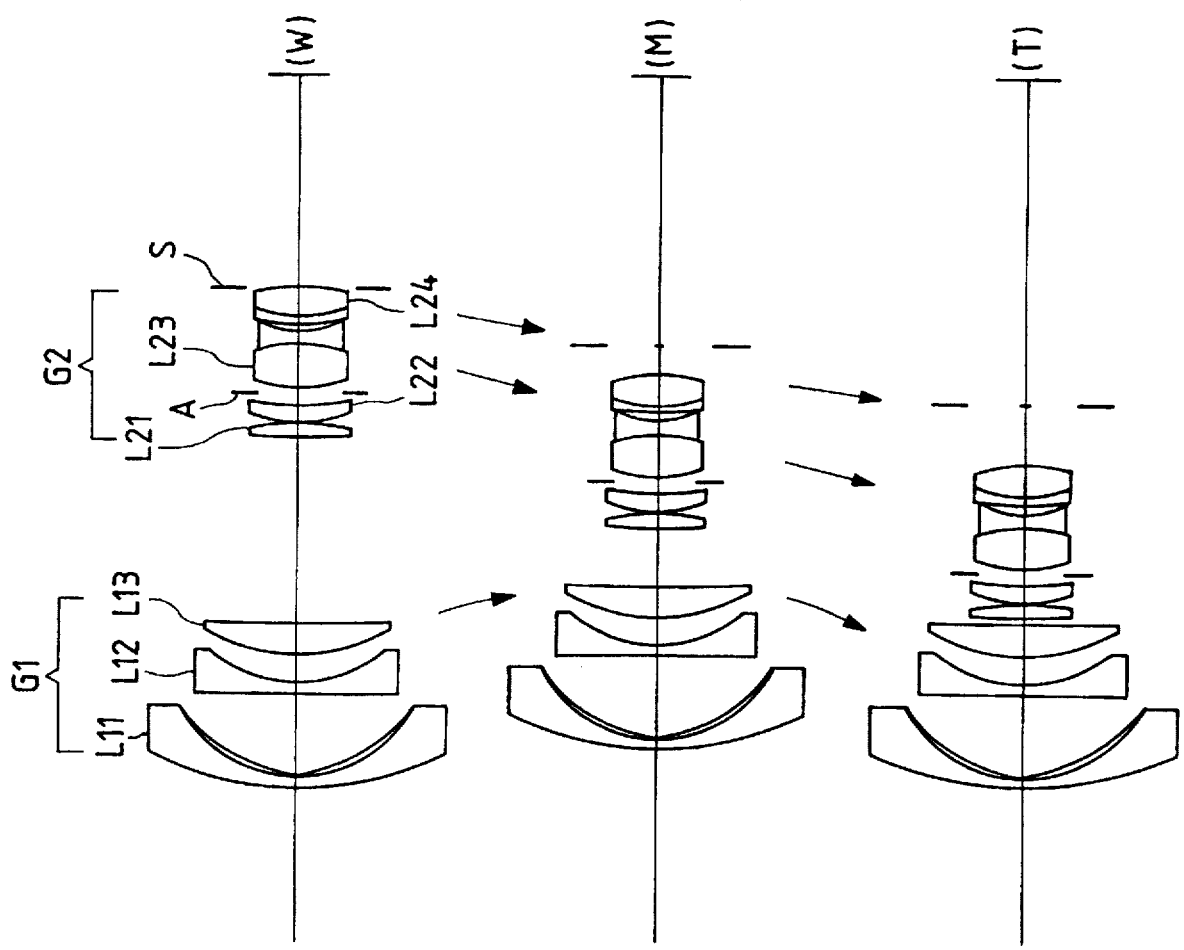
FIGS. 9A–9C show the lens construction of a zoom lens according to a third embodiment of the present invention and the movement of each lens unit during focal length change.

FIGS. 9A–9C show the lens construction of a zoom lens according to a third embodiment of the present invention and the movement of each lens unit during focal length change. In FIGS. 9A–9C, W indicates the wide angle end, M indicates the medium focal length state, and T indicates the telephoto end.

The zoom lens of FIGS. 9A–9C is comprised, in succession from the object side, of a first lens unit G1 comprising a negative meniscus lens L11 having its concave surface facing the image side, a biconcave lens L12 and a biconvex lens L13, and a second lens unit G2 comprising a biconvex lens L21, a positive meniscus lens L22 having its convex surface facing the object side, a cemented negative lens L23 consisting of a biconvex lens and a biconcave lens, and a cemented positive lens L24 consisting of a negative meniscus lens having its convex surface facing the object side and a biconvex lens.

A flare stop S is disposed forwardly (on the image side) of the second lens unit G2 in order to effectively intercept the off-axis marginal ray of light which creates great upper coma. The flare stop S, as shown in FIGS. 9A–9C, is adapted to be moved on the optical axis independently of the second lens unit G2 during focal length change and effectively intercept upper coma flare.

Also, an aperture stop A is provided between the positive meniscus lens L22 and the cemented negative lens L23. The aperture stop A, as shown, is moved with the second lens unit G2 during focal length change.

Further, the negative meniscus lens L11 in the first lens unit G1 is a compound type aspherical lens formed of a resin material and a glass material, and the image side surface thereof is formed into an aspherical shape.

In Table 3 below, there are given the values of the various elements of Embodiment 3 of the present invention. In Table 3, f represents the focal length, FNO represents F number, and $2\omega$ represents the angle of field. Further, the surface numbers indicate the order of the lens surfaces from the object side, and the refractive index and Abbe number indicate the values for d-line ($\lambda$=587.6 nm), respectively.

TABLE 3 f = 1.0–2.366
FNO = 3.61–5.66
$2\omega$ = 95.5°–48°

| surface No. | radius of curvature | surface interval | Abbe number | refractive index |
|---|---|---|---|---|
| 1 | 3.3998 | 0.1037 | 44.69 | 1.802180 |
| 2 | 1.2196 | 0.0018 | 55.63 | 1.506250 |
| *3 | 0.9551 | 0.7632 | | |
| 4 | −139.4779 | 0.0976 | 45.37 | 1.796681 |
| 5 | 1.3282 | 0.2600 | | |
| 6 | 1.8337 | 0.2744 | 27.61 | 1.755200 |
| 7 | −153.7854 | (d7 = variable) | | |
| 8 | 3.9286 | 0.1403 | 64.10 | 1.516800 |
| 9 | −5.6830 | 0.0061 | | |
| 10 | 1.0989 | 0.1646 | 58.90 | 1.518230 |
| 11 | 3.8558 | 0.1220 | | |
| 12 | ∞ | 0.0305 | (aperture stop A) | |
| 13 | 1.2621 | 0.3997 | 58.90 | 1.518230 |
| 14 | −1.3576 | 0.1220 | 37.17 | 1.834000 |
| 15 | 0.9562 | 0.0610 | | |
| 16 | 2.0528 | 0.0610 | 37.17 | 1.834000 |
| 17 | 0.9714 | 0.3049 | 64.10 | 1.516800 |
| 18 | −1.1079 | (d18 = variable) | | |
| 19 | ∞ | (d19 = variable) | (flare stopper S) | |

(aspherical surface data)

| | $\kappa$ | $C_2$ | $C_4$ |
|---|---|---|---|
| 3rd surface | 0.1957 | 0.0000 | $1.63570 \times 10^{-1}$ |
| | $C_6$ | $C_8$ | $C_{10}$ |
| | $-4.01140 \times 10^{-2}$ | $2.78050 \times 10^{-2}$ | $-2.34830 \times 10^{-2}$ |

(variable spacing in focal length change)

| f | 1.00000 | 1.70744 | 2.36602 |
|---|---|---|---|
| d7 | 1.70279 | 0.52436 | 0.06061 |
| d18 | −0.00945 | 0.28182 | 0.55307 |
| d19 | 1.97795 | 2.51888 | 3.02242 |

(condition-corresponding values)

(1) fIII/fw ≦ 2.5 = 1.607
(2) (r2 + r1)/(r2 − r1) = −0.98
(3) |fIII|/(fw · ft)$^{1/2}$ = 1.011
(4) (rb + ra)/(rb − ra) = −0.299
(5) (n11 + n12)/2 = 1.799
(6) n3n − n3p = 0.316
(7) n4n − n4p2 = 0.317
(8) fII/fw = 1.829

FIGS. 10A–10E to 12A–12E show the various aberrations of Embodiment 3, FIGS. 10A–10E showing the various aberrations at the wide angle end, FIGS. 11A–11E showing the various aberrations in the medium focal length state, and FIGS. 12A–12E showing the various aberrations at the telephoto end.

In each of these aberration graphs, FNO indicates F number, $\omega$ indicates a half angle of field, d indicates d-line ($\lambda$=587.6 nm) and g indicates g-line ($\lambda$=435.8 nm). Also, in the aberration graphs showing astigmatism, the solid line indicates the sagittal image plane and the broken line indicates the meridional image plane. Further, in the aberration graphs showing spherical aberration, the broken line indicates the sine condition.

As is apparent from each aberration graph, it is seen that in the present embodiment, the various aberrations are corrected well in the respective focal length states.

While in each of the above-described embodiments, an aspherical surface is introduced into the image side lens surface of the first negative meniscus lens L11, an aspherical surface or surfaces may be introduced into the second negative lens L12 or both of the first negative meniscus lens L11 and the second negative lens L12. Also, an aspherical surface may further be introduced into the positive lens L13 in the first lens unit G1 or into the second lens unit G2, besides the first negative meniscus lens L11 and the second negative lens L12.

Also, the aperture stop A may be disposed near the object side of the second lens unit G2 or at any location in the air space in the second lens unit G2.

Further, in each of the above-described embodiments, the flare stop S is provided rearwardly of the second lens unit G2 in order to effectively intercept upper coma, and a movement locus differing from that of the second lens unit G2 is given to this flare stop S, but any movement locus may be given to the flare stopper S as long as upper coma is effectively intercepted.

Furthermore, even if a third lens unit having weak refractive power is installed on the basis of the present invention, now that the construction of the present invention is substantially included therein, the construction can be considered to be identical and therefore, of course, a similar effect will be obtained.

Also, in the present embodiment, it is possible to display the so-called vibration preventing function of shifting (making eccentric) the second lens unit G2 relative to the optical axis to thereby correct any fluctuation of the image position attributable to hand vibration or the like.

As described above, according to the present invention, there can be realized a zoom lens which is compact and very small in the number of constituent lenses as well as low in cost and in which the variable power ratio is of the order of 2.4–2.83 and the angle of field ($2\omega$) at the wide angle end is of the order of 82°–95.5° and which has a good imaging performance.

What is claimed is:

1. A zoom lens comprising, in succession from the object side, a first lens unit G1 having negative refractive power as a whole, and a second lens unit G2 having positive refractive power as a whole, the air space between said first lens unit G1 and said second lens unit G2 being varied to thereby effect focal length change, wherein:

said first lens unit G1 has, in succession from the object side, a first negative meniscus lens component L11 having its concave surface facing the image side, a second negative lens component L12 and a third positive lens component L13 having a convex surface facing the object and said second lens unit G2 has, in succession from the object side, a first positive lens component L21, a second positive lens component L22, a third negative lens component L23, and a fourth positive lens component L24 separated from one another, at least one of the lens surfaces of said first negative meniscus lens component L11 and said second negative lens component L12 in said first lens unit G1 being formed into an aspherical shape, and the following conditions being satisfied:

$$1.2 \leq XII/fw \leq 2.5$$

$$-1 \leq (r2+r1)/(r2-r1) \leq 2,$$

where the focal length of the whole lens system at the wide angle end is fw and the maximum amount of movement of said second lens unit G2 during focal length change is XII and the radius of curvature of that surface of said second negative lens component L12 in said first lens unit G1 which is most adjacent to the object side is r1 and the radius of curvature of that surface of said second negative lens component L12 which is most adjacent to the image side is r2.

2. A zoom lens according to claim 1, wherein the following condition is satisfied:

$$0.6 \leq |fI|/(fw \cdot ft)^{1/2} \leq 1.1,$$

where the focal length of said first lens unit G1 is fI and the focal length of the whole lens system at the telephoto end is ft.

3. A zoom lens according to claim 1, wherein the following condition is satisfied:

$$-3 < (rb+ra)/(rb-ra) < 1,$$

where the radius of curvature of that surface of said fourth positive lens component L24 in said second lens unit G2 which is most adjacent to the object side is ra and the radius of curvature of that surface of said fourth positive lens component L24 which is most adjacent to the image side is rb.

4. A zoom lens according to claim 1, wherein the following condition is satisfied:

$$1.7 \leq (n11+n12)/2 < 2,$$

where the refractive index of said first negative meniscus lens component L11 in said first lens unit G1 for d-line is n11 and the refractive index of said second negative lens component L12 for d-line is n12.

5. A zoom lens according to claim 1, wherein said third negative lens component L23 in said second lens unit G2 has, in succession from the object side, a cemented negative lens component consisting of a positive lens and a negative lens, and the following condition is satisfied:

$$0.1 < n3n - n3p < 0.5,$$

where the refractive index of the positive lens in said cemented negative lens component for d-line is n3p and the refractive index of the negative lens in said cemented negative lens component for d-line is n3n.

6. A zoom lens according to claim 1, wherein said fourth positive lens component L24 in said second lens unit G2 has, in succession from the object side, a cemented positive lens component consisting of a negative lens and a positive lens, and the following condition is satisfied:

$$0.1 < n4n - n4p < 0.5,$$

where the refractive index of the positive lens in said cemented positive lens component for d-line is n4p and the refractive index of the negative lens in said cemented positive lens component for d-line is n4n.

7. A zoom lens according to claim 1, wherein the following condition is satisfied:

$$1.0 < fII/fw < 2.5,$$

where the focal length of said second lens unit G2 is fII and the focal length of the whole lens system at the wide angle end is fw.

8. A zoom lens according to claim 1, wherein the image side surface of said first negative meniscus lens component L11 in said first lens unit G1 is formed into an aspherical shape.

9. A zoom lens according to claim 2, wherein the following condition is satisfied:

$$-3 < (rb+ra)/(rb-ra) < 1,$$

where the radius of curvature of that surface of said fourth positive lens component L24 in said second lens unit G2 which is most adjacent to the object side is ra and the radius of curvature of that surface of said fourth positive lens component L24 which is most adjacent to the image side is rb.

10. A zoom lens according to claim 9, wherein the following condition is satisfied:

$$1.7 \leq (n11+n12)/2 < 2,$$

where the refractive index of said first negative meniscus lens component L11 in said first lens unit G1 for d-line is n11 and the refractive index of said second negative lens component L12 in said first lens unit G1 for d-line is n12.

11. A zoom lens according to claim 10, wherein said third negative lens component L23 in said second lens unit G2 has, in succession from the object side, a cemented negative lens component consisting of a positive lens and a negative lens, and the following condition is satisfied:

$$0.1 < n3n - n3p < 0.5,$$

where the refractive index of the positive lens in said cemented negative lens component for d-line is n3p and the refractive index of the negative lens in said cemented negative lens for component d-line is n3n.

12. A zoom lens according to claim 11, wherein said fourth positive lens component L24 in said second lens unit G2 has, in succession from the object side, a cemented positive lens component consisting of a negative lens and a positive lens, and the following condition is satisfied:

$$0.1 < n4n - n4p < 0.5,$$

where the refractive index of the positive lens in said cemented positive lens component for d-line is n4p and the refractive index of the negative lens in said cemented positive lens component for d-line is n4n.

13. A zoom lens according to claim 12, wherein the following condition is satisfied:

$$1.0 < fII/fw < 2.5,$$

where the focal length of said second lens unit G2 is fII and the focal length of the whole lens system at the wide angle end is fw.

14. A zoom lens according to claim 13, wherein the image side surface of said first negative meniscus lens component in said first lens unit G1 is formed into an aspherical shape.

15. A zoom lens according to claim 2, wherein the following condition is satisfied:

$$1.7 \leq (n11+n12)/2 < 2,$$

where the refractive index of said first negative meniscus lens component L11 in said first lens unit G1 for d-line is n11 and the refractive index of said second negative lens component L12 in said first lens unit G1 for d-line is n12.

16. A zoom lens according to claim 15, wherein said third negative lens component L23 in said second lens unit G2 has, in succession from the object side, a cemented negative lens component consisting of a positive lens and a negative lens, and the following condition is satisfied:

$$0.1 < n3n - n3p < 0.5,$$

where the refractive index of the positive lens in said cemented negative lens component for d-line is n3p and the refractive index of the negative lens in said cemented negative lens component for d-line is n3n.

17. A zoom lens according to claim 16, wherein said fourth positive lens component L24 in said second lens unit G2 has, in succession from the object side, a cemented positive lens component consisting of a negative lens and a positive lens, and the following condition is satisfied:

$$0.1 < n4n - n4p < 0.5,$$

where the refractive index of the positive lens in said cemented positive lens component for d-line is n4p and the refractive index of the negative lens in said cemented positive lens component for d-line is n4n.

18. A zoom lens according to claim 17, wherein the following condition is satisfied:

$$1.0 < fII/fw < 2.5,$$

where the focal length of said second lens unit G2 is fII and the focal length of the whole lens system at the wide angle end is fw.

19. A zoom lens according to claim 18, wherein the image side surface of said first negative meniscus lens component L11 in said first lens unit G1 is formed into an aspherical shape.

* * * * *